April 24, 1928.
G. D. HARRIS
1,667,315
METHOD OF CONDITIONING SHOES AND ANALOGOUS PRODUCTS
Filed Jan. 17, 1925   2 Sheets-Sheet 1
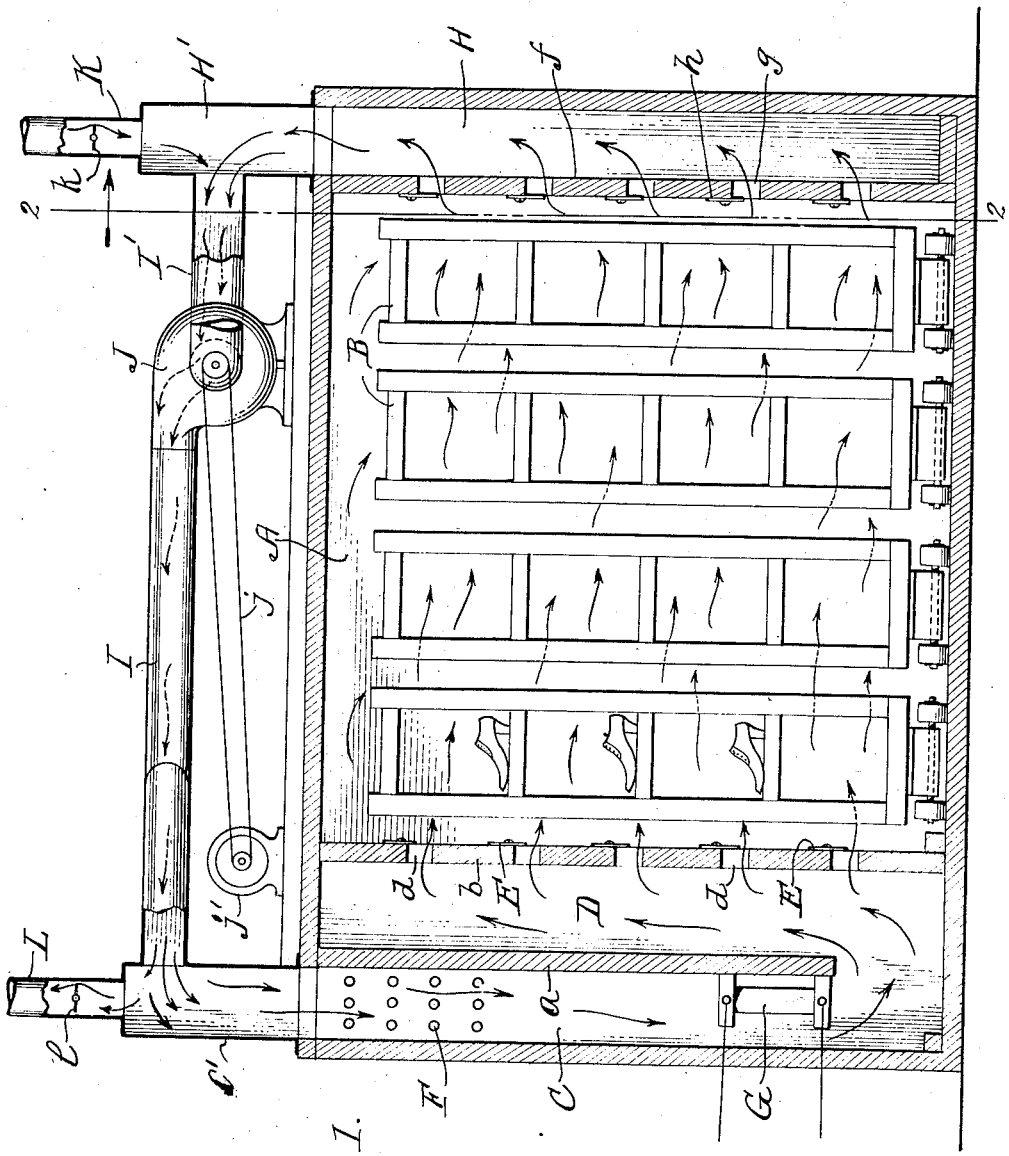

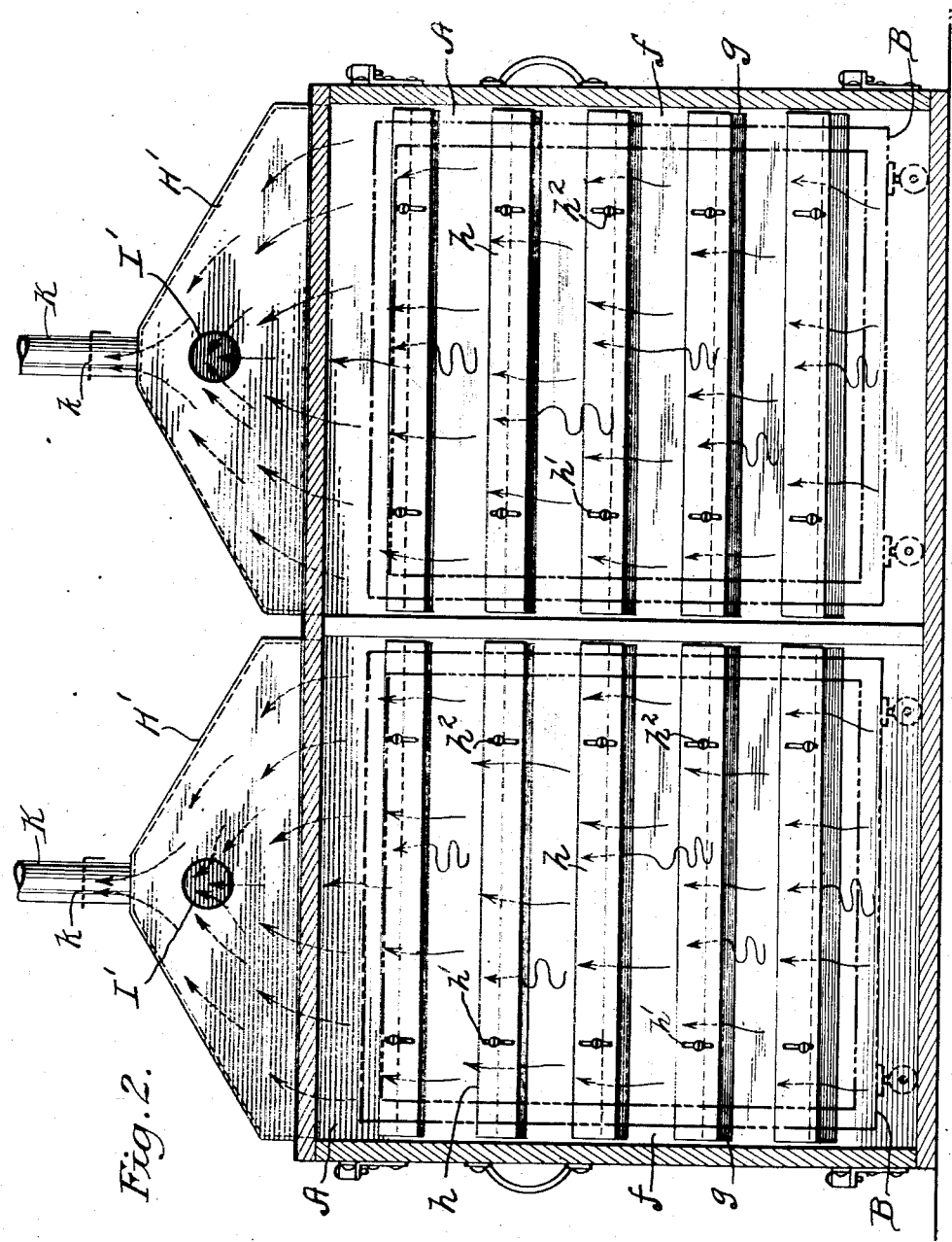

Patented Apr. 24, 1928.

1,667,315

UNITED STATES PATENT OFFICE.

GORDON D. HARRIS, OF FREEPORT, NEW YORK, ASSIGNOR TO THE INDUSTRIAL DRYER CORPORATION, OF STAMFORD, CONNECTICUT, A CORPORATION OF CONNECTICUT.

METHOD OF CONDITIONING SHOES AND ANALOGOUS PRODUCTS.

Application filed January 17, 1925. Serial No. 3,139.

This invention pertains to the art of and apparatus for conditioning various products, such as shoes, wherein the various components of such product contain moisture to different degrees, i. e. one or more components of the article contain a certain percentage of moisture, whereas other components of the same article contain a higher or lower percentage of moisture. As an example in the case of shoes, the counter may and in practice does contain a higher percentage of moisture than the upper, due to the fact that the upper is in a more or less dry condition owing to exposure to air during the various stages of its production, whereas the counter is more or less saturated with moisture to increase its pliability in the operation of shaping or molding it; and, furthermore, the boxtoe of the embryo shoe may or does contain a still greater percentage of moisture owing to its composition which renders the moisture content in excess of that present in either the upper or the counter. Due to this variation in the moisture content of the components of the product, the operation of conditioning the product after the various components have been assembled in the now familiar process of making shoes, as well as other articles, is attended with much loss of time, resulting ultimately in increased cost of production and delays in filling orders for the commodity; but more serious still is the effect upon the article as a whole of unequal drying of the various components, which inequality in drying results in unequal shrinkages of the components and the development of stresses which deforms the product so that it is out of shape and does not fit or wear.

According to my invention the product is conditioned by the elimination of moisture equally from its various components to the end that all of such components will dry equally with relation to each other, whereby unequal shrinkages in the components of the products are avoided and said product is kept in a proper condition. Freedom from wrinkling is a pronounced characteristic of the various components of the product, for the reason that all of such components shrink equally so as to conform to the last. Again, no unequal stresses on the various components exist in the product owing to the equal drying of such components, and various other advantages are also obtained, such as freedom from "blooming", so-called, sweating, and other trade conditions now known in the shoe trade as detrimental to the product.

The object of my invention is to condition shoes and other products with a view to improving the quality and effect economy in the manufacture of such products; further, to secure these results each day in the year regardless of weather conditions and without changing appreciably the specification (humidity and temperature schedules) of operation or the time schedule of operation due to weather conditions or the seasons of the year; and to produce articles which are superior in every way to the ordinary commercial article, free from the existing and recognized defects and free, also, from the requirements to degrade the product owing to imperfections in manufacture, thereby insuring quality, uniform production, and effecting a saving in lasts, and in the time required for the treatment.

My invention in the process of conditioning the product, such as shoes, is designed to be carried into practice by the aid of a suitable apparatus, one practical form of which is illustrated in the accompanying drawings, wherein—

Figure 1 is a vertical section through the apparatus, the arrows showing the direction of circulation of the drying atmosphere.

Figure 2 is a vertical cross section taken on the line 2—2 of Figure 1 through the products sections of a plurality of units of a multiple form of the drying apparatus.

In the form of apparatus shown, A is the products section or chamber for containing racks B which carry the products, such as shoes, to be conditioned, i. e. dried by the elimination of excess moisture uniformly from all parts or components of the product. The racks B may be of any suitable construction to carry a load of shoes, but as shown each rack is of skeleton formation to provide for the free circulation therethrough of the drying atmosphere, and, further, each rack is a wheeled structure to facilitate its introduction and removal with reference to the products section or chamber A.

At or near one end, the apparatus is divided by vertical walls $a$, $b$, to produce a conditioning chamber C, and a distributing chamber or duct D, the latter being intermediate the products chamber A and conditioning chamber C. The wall $b$ separating chamber A from chamber or duct D is provided with a series of ports $d$ through which the drying atmosphere is free to flow from duct D into chamber A, the series of such ports being useful in distributing the flow of the drying atmosphere equally in the various parts of the products chamber, from top to bottom thereof. The effective area of the ports $d$ is controllable by adjustment of gates or valves E, one for each horizontal port or series of ports $d$. Said valves or gates may be of any construction suitable for the purposes, but it is preferred to adjustably fasten each valve or gate E in position relatively to the port $d$ controlled by said valve or gate, the said adjustment being obtained by the use of slots and bolts in the manner of fastening and adjusting the gates or valves $h$ shown in Figure 2 and hereinafter described, whereby each valve may be raised or lowered as required relatively to the port $d$ for effecting a variation in the effective area of said port.

The conditioning chamber C is adapted to contain means of one form or another for supplying the required heat units to the drying atmosphere. Such heaters may be either steam coils, indicated at F, or electric heaters indicated at G, but the heating means are in the line of flow of the drying atmosphere which passes downwardly within the chamber C and emerges from the bottom part thereof, into the chamber or duct D, whence the atmosphere is distributed through ports $d$ uniformly into the products chamber.

At the other end, the products chamber is divided by a vertical wall $f$ to produce an education flue or chamber H, said wall being provided with a vertical series of outlet ports $g$, the area of which ports is controllable by valves or gates $h$, the latter being slotted at $h'$ and fastened adjustably by bolts $h^2$. Said ports $g$ and gates $h$ at the delivery end of chamber A correspond to the ports $d$ and gates E at the feeding end of products chamber A.

The conditioning chamber C is surmounted by a dome C', whereas the eduction chamber is surmounted by a similar dome H', said domes providing for the convenient attachment of the circulating pipes I I' which are connected to the circulating fan or blower J. As shown, the pipe I' leads from the dome H' of the exhaust flue to the eye or intake of the blower, whereas the pipe I leads from the outlet of the blower to the dome C' of the conditioning chamber C. As is usual means are provided for rotating the fan at the required speed for circulating a given volume (cubic feet) of air within a given period of time, said means being depicted as a belt $j$ running to the blower from a motor $j'$.

K is an inlet duct for fresh atmospheric air, connected to the crown of dome H', and within this inlet duct is a damper or valve $k$, adapted for control in a suitable way; either by hand, or by automatic means of one form or another, whereby the gate may be opened, closed, or set for shutting off or determining the volume of fresh air supplied to the drying atmosphere in its cycle of operations within the apparatus.

L is an exhaust pipe connected to the crown of the dome C' for the conditioning chamber, said pipe having a damper or valve $l$ adapted to be opened, closed or set either by hand, or by automatic means of one form or another, for controlling the outflow of a given volume of the drying atmosphere.

As shown in Figure 2, the apparatus may be, and preferably is, constructed in multiple, each unit of said multiple apparatus including a products chamber and the various elements herein described, and illustrated in Figure 1.

The apparatus herein disclosed is designed more particularly for conditioning shoes, in the process of making them, although it will be distinctly understood that I do not confine my invention to the treatment of this particular commodity.

The operation of conditioning shoes is carried into practice in accordance with a schedule of a determined humidity content and temperature of the drying atmosphere determined initially by experiment as best suited to the particular commodity to be treated. Briefly stated, the principle of the operation is based upon the well known theory of two bodies of different densities equalizing, it being an accepted law of physics that dry air will become humid when in contact with a wet surface and, further, that a dry surface will become moist when in contact with wet or moisture laden air.

It is well known in the production of shoes, the components, including the box toe, counter, insole and upper, all possess varying degrees of moisture, and when such different parts are assembled with respect to a last, the problem is presented of creating a condition that will prevent the most dry component or part, usually the upper and insole, from drying too rapidly and at the same time to dry the wetter parts (counter and box toe), to the same condition as the part or parts which it is desired to prevent from further drying. By controlling the elimination of moisture from the least dry section or component of the product, while at the same time gradually eliminating moisture from the wetter part or component of the product, the several components of the shoe are free to conform perfectly to the last for the reason that during the drying period the various moisture contents of the shoe are equalized, and all parts or sections of the shoe will be dried in relation to each other, and the shoe is conditioned free from wrinkles and will retain its shape so as to obtain increased wear and to fit properly to the foot.

In my process I utilize a moving volume of atmospheric air which is "built up" or conditioned both as respects its moisture content and its temperature, and in these particulars the drying atmosphere contains a percentage of humidity corresponding to the moisture content of the least moist part of the product (the upper and insole), whereas said atmosphere is conditioned by the heater to a temperature best suited to attain a diffusion of moisture in the wetter parts of components (counter and box toe) of the shoe, the heaters for the drying atmosphere operating to supply thereto during the cycle of its recirculation the heat units in ratio to the moisture evaporated from the product.

For maintaining the specification of operation during the drying and conditioning period of the product, and to take care of the increasing humidity in the drying atmosphere, which increase of humidity is occasioned by the elimination of moisture from the product, such atmosphere is reconditioned continuously during its cycle of operation within the apparatus. Such reconditioning of the drying atmosphere is effected by exhausting through the valved exit pipe L a certain volume of moisture laden air and compensating for the discharged air a like amount of fresh atmospheric air or "new" air supplied through the valved intake pipe K, whereby the drying atmosphere flowing through the chamber A and into contact with the product carried by the racks B will remain or always be subjected to treatment according to the scheduled specification of operations.

As an example of the specification of operations, let it be assumed that the product to be treated is an incomplete shoe, the components of which have moisture contents which vary in the different components at the period of assemblage of such components into the unfinished shoe, that the time required for the operation of conditioning a shoe is determined to be eight (8) hours, more or less, for evaporating the total amount of moisture present in the various components of the shoe, and that the drying atmosphere is conditioned to a temperature of 120° Fahr. and 85% humidity. The operating temperature of the drying atmosphere is suited to diffuse the contained moisture in the different parts of the shoe, whereas the percentage of humidity equals or corresponds to that part of the shoe having the least moisture.

Now, the speed of the fan is determined to be such as will move 1,200 cubic feet of air per minute, and that the apparatus has been operated for a period of time so as to "build up" or condition the atmosphere to the required temperature (120° Fahr.) and humidity (85%). The atmosphere is circulated within a closed path constituted by the chambers A, C, D, H, the pipes I I', and the fan, the valves k, l, being closed, so that the atmosphere flows from the distributing flue D through the selective air ports d and flows thence through the chamber A and into contact with the shoes on the racks B, thence through ports g into flue H, and thence through pipe I', fan J, and pipe I, back to the chamber C. In the operation, the valves k, l, are opened a determined amount to permit the discharge through pipe L of, say, 200 cubic feet of air per minute, and the inflow through pipe K of a corresponding volume (200 cubic feet per minute) of fresh atmospheric air, but at a certain stage in the operation there is only 1,000 cubic feet of air circulated per minute by the fan, and that the drying atmosphere contains, say, one (1) per cent excess humidity and that its temperature has decreased to 118° Fahr. due to the absorption of moisture from the material and the exchange of heat for moisture. Now, the air is drawn through flue H by the fan, but the valve k being open, 200 cubic feet of fresh or new air is added to the atmosphere owing to the inflow of fresh air through pipe K, making the fan capacity 1,200 cubic feet per minute. The fresh air thus added to the drying atmosphere is thoroughly mixed by the motion of the fan, and the mixed atmosphere is forced through chamber C into flue D by way of pipe I and header C', where 200 cubic feet of air per minute is discharged through pipe L, the valve l being open, thus reducing the volume of the drying atmosphere to 1,000 cubic feet circulated per minute by the fan through the chamber A, the mixed air flowing into contact with the heaters F G, whereby the air is reconditioned and heated to the operating specifications.

The compensating air admitted by pipe K and discharged air which flows through pipe L will change to meet the conditions of greatest excess humidity and the least excess humidity. It is to be understood that the greatest excess humidity and the least excess humidity are in no way connected with or related to the specification of operation, for the reason that the scheduled specification of the drying atmosphere (say 120° Fahr. and 85% humidity) is maintained throughout the drying and conditioning period of the products, and that such scheduled specification is related to the least moisture containing section or component of the shoe. The reference to excess humidity means the greatest amount of moisture evaporated from the shoes and this occurs at the beginning of the process or treatment of the products, whereas the reference to least humidity means the least amount of moisture evaporated from the products, and this occurs at the last period of the drying and conditioning operation.

From the beginning to the finish of the drying and conditioning period, the amount of moisture evaporated from the products decreases owing to the exchange of heat for moisture, and to meet this condition in the drying atmosphere, provision is made for supplying heat units to such atmosphere in ratio to the evaporation from the products, by which I mean that such heat units for evaporation become latent and in no way affect the operating temperature of the air. The heaters F or G, or both, are availed of for reheating the drying atmosphere during its cycle of operations within the apparatus.

Where it is found that the rate of diffusion (i. e. moisture equalizing and coming to the surface) varies between, say, leather sole and a counter composed of materials to secure hardness in such counter, then the component that diffuses slowest (i. e. allows its contained moisture to come slowe t to the surface) is utilized to determine the drying and conditioning period, and if it is found that eight (8) hours is the proper time within which the products may be dried, then the moisture load is determined, i. e. the total moisture to be evaporated from a drying charge of a certain number of shoes. This amount of water is divided down to the amount of water to be evaporated per minute, and such amount constitutes the excess humidity to be removed from the product. Having ascertained this factor in the drying problem, the valve $l$ in the exit pipe L is adjusted to a determined point for discharging a certain volume of moisture laden air from the circulatory path for the drying atmosphere, and concurrently with the adjustment of the means for discharging some of the air the valve $k$ in the fresh air intake is opened to such an extent as to permit the inflow of an equal volume of fresh atmospheric air to be mixed with the drying atmosphere, such inflow of fresh air serving to maintain the fan volume of 1,200 cubic feet per minute. In other words, after determining that the drying period for a given charge of the products shall be eight (8) hours, and that the total amount of moisture to be evaporated from the shoes would be 200 grains of water vapor per minute over the entire period of eight (8) hours, then the apparatus is set for the exit L to discharge the number of cubic feet per minute of the air that would equal or carry 200 grains of water vapor, and concurrently the fresh air intake $k$ permits the inflow of a corresponding volume of fresh atmospheric air to restore to the drying atmosphere the amount of air discharged through the exit L. This discharge of a given volume of moist air and its replacement by a corresponding volume of fresh air maintains the drying atmosphere at its required humidity and such atmosphere is reheated during its cycle of operations so as to be kept up to the specification of operations, the effect of which is to keep the least wet parts of the shoes from drying too rapidly or to an excess, and, further, the drying and conditioning period for a given charge of shoes is intended to meet the rate of diffusion of those parts of the shoes which are slowest in permitting the contained moisture to equalize and come to the surface of such parts or components.

By conducting the conditioning of the product in accordance with a specification of operation, I am enabled to dry all parts or the various components of the shoes, or other articles, in relation to each other without creating stresses or strains in any one or more parts. Furthermore, my mode of procedure prevents over drying of any one or more components of the shoes, for the reason that such parts as are commercially dried prior to conditioning are maintained at the moisture content of the other parts which contain more moisture, and thus all the parts are gradually dried uniformly during the given drying period.

By reference to Figure 1 it will be noted that division walls $b$, $f$, are provided at the respective sides of the products chamber, that vertical series of ports $d$, $g$, are provided in the respective walls, and that gates or valves operable at will are positioned adjacent such ports $d$, $g$, for varying the effective areas of the ports.

The air ports $g$ in wall $f$ are so related to the air ports $d$ in wall $b$ as to insure the flow of the drying atmosphere directly across the products chamber, and uniformly through the racks B and the drying charge constituted by the load of shoes on such racks. The gates E associated with the ports $d$ on the pressure side of the products chamber are shiftable so as to be opened or closed in a manner to establish an even head or pressure of the drying atmosphere through the several ports of the series, thus securing an even distribution and proper velocity of the atmosphere as it enters the drying and conditioning chamber A.

The apparatus disclosed herein forms the subject-matter of a separate application Serial No. 264,587, filed March 26th, 1928, as a division of this application based on the method.

Having thus fully described the invention, what I claim as new and desire to secure by Letters Patent is:

1. In the art of conditioning products the different components of which have varying moisture contents, the process which consists in exposing the products within a chamber to a drying atmosphere the humidity of which corresponds substantially to that component having the lowest moisture content, circulating the atmosphere within a closed circulatory path which includes said chamber for the product, heating the atmosphere to a desired temperature during the repeated cycles of its circulation, and conditioning the drying atmosphere by discharging from its circulatory path a given volume of moist air and feeding to the circulatory path a corresponding volume of fresh atmospheric air.

2. In the art of conditioning unfinished shoes the various components of which during the production of the shoe possess moisture contents of varying degrees, the process which consists in exposing the shoe within a chamber to the action of a drying atmosphere the humidity of which is approximately equal to that component of the shoe having the lowest moisture content and the temperature of which atmosphere is effective in diffusing the moisture within the shoe components possessing the excess moisture content, circulating the drying atmosphere within a closed path including said chamber, heating the atmosphere during the repeated cycles of its circulation, and conditioning the atmosphere by discharging from the circulatory path a given volume of moist air and feeding to said circulatory path a corresponding volume of fresh atmospheric air, whereby said reheating and conditioning of the atmosphere during its recirculation serve to maintain said atmosphere at a prescribed humidity and temperature suited to diffuse the moisture content of certain shoe components and to retard the evaporation from other shoe components, to the end that various shoe components are dried with relation to each other.

3. In the art of conditioning shoes the components of which possess different degrees of moisture content, the process which consists in subjecting the shoes to the action of a drying atmosphere the humidity of which is approximately equal to that component of the shoe having the least moisture content, circulating the drying atmosphere into repeated contacts with the shoes, and conditioning such atmosphere as to temperature and humidity during such circulation.

4. In the art of conditioning shoes the components of which contain different degrees of moisture content, the process which consists in exposing the shoes to contact with a flowing atmosphere the humidity of which is approximately equal to that component of the shoe having the least moisture content.

In testimony whereof I have hereto signed my name this 5th day of January, 1925.

GORDON D. HARRIS.